April 11, 1950     W. L. FLAGLER     2,503,814
WIRE STRINGING DEVICE
Filed May 7, 1948
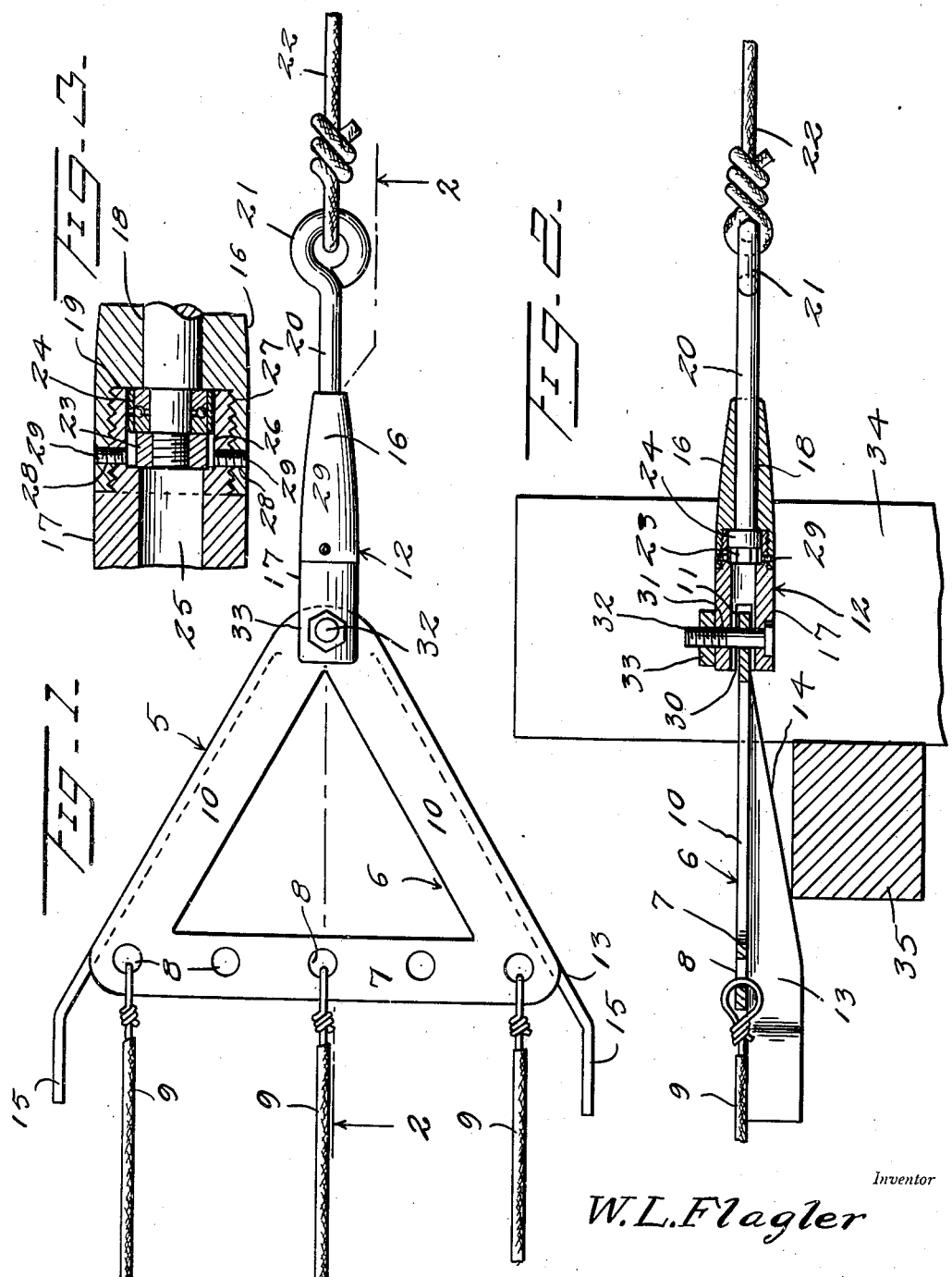
Inventor
W. L. Flagler
By John N. Randolph
Attorney Patented Apr. 11, 1950

2,503,814

UNITED STATES PATENT OFFICE 2,503,814

WIRE STRINGING DEVICE

Walter L. Flagler, Wilmington, Calif.

Application May 7, 1948, Serial No. 25,764

1 Claim. (Cl. 175—376)

This invention relates to a novel device for simultaneously stringing a plurality of wires over the cross arms of a number of poles extending along a given line and more particularly has reference to a device of extremely simple construction to which a plurality of wires to be strung are attached and which is in turn attached to a pulling line.

More particularly, it is an aim of the present invention to provide a wire stringer having means adapted to readily ride over the cross arms of the poles and other obstructions to prevent the wires being strung from being fouled or becoming hung up on said cross arms and which will prevent the wires from becoming crossed or entangled.

Another object of the invention is to provide a novel swivel connection forming a part of the device and which is adapted to be connected to the pull line to permit the rope to readily twist relatively to the device to prevent any tendency of the device to turn on its longitudinal axis especially as it is moving between cross arms of adjacent poles and which would otherwise readily occur especially when a strain is placed upon the pull line.

Various other objects and advantages of the invention will hereinafter become more fully apparent from the following description of the drawing, illustrating a presently preferred embodiment thereof, and wherein:

Figure 1 is a top plan view showing the device attached to a plurality of lines to be strung and to a pull line;

Figure 2 is a longitudinal sectional view of the device taken substantially along a plane as indicated by the line 2—2 of Figure 1, and Figure 3 is an enlarged fragmentary central sectional view of a portion of the swivel of the device.

Referring more specifically to the drawing, the wire stringing device in its entirety is designated generally 5 and includes an open triangular frame 6 having longitudinally spaced openings formed in one side 7 thereof and which openings 8 are adapted to be engaged by the ends of a plurality of wires 9 to be strung. The apex of the other two corresponding sides 10 of the triangular frame 6 constitutes the leading end of said frame and is provided with an opening 11 to which a swivel, designated generally 12 and constituting an important part of the stringing device 5 is detachably connected. The frame 10 is provided with a pair of runners 13 one of which is attached to the under side of each of the frame sides 10 adjacent its outer edge and so that said runners are disposed longitudinally of said sides and with their planes at substantially right angles to the plane of the frame 6. The bottom edges of the runners 13 are provided with beveled forward ends 14 which merge with the upper edges thereof adjacent the apex or leading end of the frame 6 and said runners 13 extend rearwardly to beyond the rear end of the frame sides 10 and are provided with trailing terminal portions 15 which are disposed substantially parallel.

The swivel 12 includes an elongated body composed of a forward section 16 and a rear section 17. The forward section 16 has a bore 18 extending longitudinally therethrough and which is provided with an enlarged rear end forming a rearwardly opening socket 19 which is internally threaded. A rod or shaft 20 extends through and is rotatably disposed in the bore 18 and is provided with an eye 21 at its outer, forward end to which a pull rope or line 22 is adapted to be tied. The opposite, rear end of the rod 20 is threaded and preferably reduced in diameter to receive a retaining nut 23 which detachably retains a thrust bearing 24 on said rod 18 forwardly of and adjacent the nut 23. The thrust bearing 24 may likewise be mounted on a slightly reduced portion of the rod or shaft 18 and said bearing and nut are disposed in the socket 19 and with one end of the thrust bearing bearing against the bed of said socket to minimize the frictional resistance of rotation of the rod or shaft 20 with respect to the swivel section 16 when a pull is being exerted thereon by the line or rope 22.

The rear swivel section 17 has a bore 25 extending longitudinally therethrough and the forward end of which is enlarged to form a socket 26 also for the purpose of accommodating the nut 23 and thrust bearing 24. The forward end of the section 17 is externally reduced and threaded as seen at 27 to threadedly engage in the socket 19 and said threaded portions are provided with radial threaded bores 28 which align when the sections 16 and 17 are fully connected for receiving retaining screws 29, preferably of the "Allen type." The section 17 is provided with a diametrical slot 30 which opens outwardly of its rear end to receive the leading end of the frame 6 and said rear end of the section 17 is also provided with a bore or opening 31 disposed at right angles to the slot 30 and which is adapted to register with the opening 11 to receive a headed bolt 32 which extends therethrough and which is held in an applied position by a nut 33. The head of the bolt 32 which is disposed on the under side of the section 17 is countersunk therein as seen in Figure 2 and the forward portion of the section 16 is externally tapered, for a purpose which will hereinafter become apparent.

From the foregoing it will be readily apparent that any suitable means may be provided for exerting a pull on the rope or line 22 for moving the wire stringing device 5 from left to right of Figures 1 and 2 for stringing the wires 9 over the cross arms of a plurality of poles arranged along a given line, one of which poles is shown in Figure 2 fragmentarily at 34 provided with a cross arm 35 over which the stringing device is moving. It will be noted that as the stringing device approaches the cross arm 35 the swivel section 16 will engage the upper side of said cross arm and due to the taper of its forward end will readily ride thereover. As the swivel body 12 provides a smooth surface, said body will readily slide over the upper surface of the cross arm 35 and the trailing end thereof extends to below the leading end of the beveled edges 14 of the runners 13 so that as the swivel body 12 passes over the cross arm 35 the beveled edges 14 of the runners 13 will engage said cross arm for elevating the frame 6 relatively to the cross arm so that the leading ends of the wires 9, attached to said frame 6 will readily clear the cross arm thus preventing any possibility of the stringing device or wires 9 becoming fouled or hanging up on the cross arm 35. It will be readily apparent that a considerable pull will be exerted on the rope or line 22 for stringing the wires 9 and accordingly when the strain is placed on the rope or line 22 it will have a tendency to twist. During the movement of the stringing device 5 between cross arms 35 of adjacent poles, it is important that the device 5 does not rotate on its longitudinal axis which would result in the wires 9 becoming twisted and for this reason the thrust bearing 24 is provided so that the shaft 20 can rotate freely in the swivel body 12 to prevent the frame 6 from being rotated and so that the runners 13 will always be in depending position with respect to said frame for riding over the next cross arm 35 toward which the stringing device is being drawn.

Various modifications and changes are contemplated and may obviously be resorted to, without departing from the spirit or scope of the invention as hereinafter defined by the appended claim.

I claim as my invention:

A wire stringing device comprising a forwardly converging frame having transversely spaced means at the trailing end thereof adapted for attachment thereto of a plurality of wires to be strung, a pair of forwardly converging runners attached to and depending from the under side of said frame adjacent its forwardly converging side edges, and an elongated swivel including a swivel body having a trailing end detachably fastened directly to and extending from the leading end of said frame and adapted to be secured at its forward end to a pull rope or line for forming a swivel connection between said line and frame, said swivel body being circular in cross section throughout its length and being tapered toward its forward end forming a cone, said runners having bottom edges beveled toward their forward ends and including forward portions disposed above the level of the under side of said swivel body and adjacent thereto to facilitate the movement of said frame over the cross arm of a pole, said runners extending beyond the trailing end of said frame and having bottom edge portions disposed substantially below the trailing end of said frame whereby the wires attached thereto will be caused to pass over the cross arm substantially above the level thereof through engagement of the bottom edges of the runners with the upper surface of the cross arm.

WALTER L. FLAGLER.

REFERENCES CITED

The following references are of record in the file of this patent:

UNITED STATES PATENTS

| Number | Name | Date |
|--------|------|------|
| 1,265,851 | Williams | May 14, 1918 |
| 1,563,377 | Klein | Dec. 1, 1925 |
| 1,676,584 | Tideman | July 10, 1928 |